(No Model.)
W. FOGLESONG.
HORSE COLLAR STUFFING MACHINE.
No. 349,035. Patented Sept. 14, 1886.
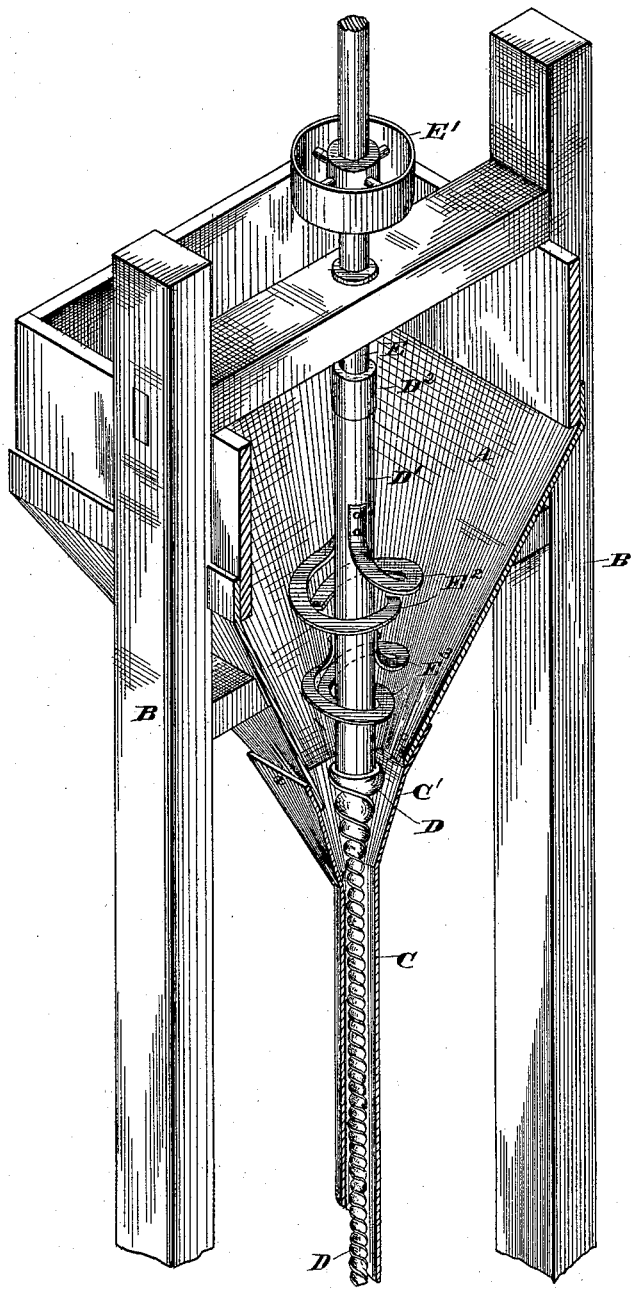
Witnesses:
Edw. J. Walker
Wm. E. Dyre
Inventor:
Washington Foglesong
by his attorney

UNITED STATES PATENT OFFICE.

WASHINGTON FOGLESONG, OF DAYTON, OHIO.

HORSE-COLLAR-STUFFING MACHINE.

SPECIFICATION forming part of Letters Patent No. 349,035, dated September 14, 1886.

Application filed January 25, 1886. Serial No. 189,686. (No model.)

*To all whom it may concern:*

Be it known that I, WASHINGTON FOGLESONG, a citizen of the United States, residing at Dayton, in the county of Montgomery and State of Ohio, have invented certain new and useful Improvements in Collar-Stuffing Machines; and I do hereby declare the following to be a full, clear, and exact description of the invention, such as will enable others skilled in the art to which it appertains to make and use the same.

This invention relates to a machine designed for stuffing horse-collars with chopped straw; and it consists of the combination of a feed-tube, and a feed screw within the tube extending to the outer end thereof, the shank of the feed-screw within the hopper being provided with open spiral agitators, to prevent the chopped straw from bridging across the hopper.

In order that my invention may be clearly understood, I have illustrated in the annexed drawing and will proceed to describe a practical form thereof.

The drawing represents a sectional perspective view of my improved collar-stuffing machine.

The machine consists of a hopper, A, mounted in a vertical position on a suitable framework, B, the feed-tube C, constructed with a funnel-shaped head, C', by which it is attached to the lower end of the hopper, the feed-screw D within the feed-tube C, and the vertical shaft E, for rotating the feed-screw, the upper end of the shaft being provided with a pulley, E', for driving it by means of a belt. The feed-screw is of auger-like construction, and fits more or less loosely within the feed-tube, extending to the extreme outer end thereof. The threads at the upper end of the feed-screw are made of increasing diameter, corresponding to the funnel-head C' of the feed-tube. The shank D' of the feed-screw has secured to it, at suitable distances apart, two sets of open spirals, E² and E³, which serve to agitate the straw to prevent it from bridging across the hopper, and force it down into the funnel-head C' of the feed-tube, to be acted upon by the enlarged end of the feed-screw D. These sets of open spiral agitators are placed at right angles to each other, and are composed of two flat strips of metal secured on opposite sides of the shank D', and wound spirally about three-fourths around said shank, the ends of said strips being nearer the shank of the feed-screw than their centers, and the upper set being of larger diameter than the lower set. This shank D' is coupled to the lower end of shaft E by the coupling D², so that it may be readily detached from the shaft. The feed-tube is secured to the hopper in such a manner as to be readily removable therefrom, and is cut off slantingly at its outer end, partly exposing the feed-screw, which is thus enabled to discharge the chop more gradually and distribute it more advantageously.

I propose to furnish with each machine a set of different sizes of feed-tubes and feed screws, in order that the same machine may be used for stuffing different sizes of collars by simply interchanging the feed-tubes and feed-screws.

In operating this machine the chopped straw is taken from the hopper by the feed-screw and fed, somewhat compacted, to the lower end of the feed-tube, from which it is discharged by the feed-screw into the horse-collar and compacted therein to the degree desired by the operator, who can determine the hardness of the stuffing by holding the collar with a greater or lesser force against the end of the feed-tube.

I claim as my invention—

1. A machine for stuffing horse-collars with chopped straw, composed of a hopper, a feed-tube, the feed-screw within the feed-tube and extending to the outer end thereof, and the open spiral agitator secured to the shank of the feed-screw, substantially as before set forth.

2. A machine for stuffing horse-collars with chopped straw, composed of a hopper, a feed-tube cut slantingly at its outer end, the feed-screw within the feed-tube and extending to the outer end thereof, and the open spiral agitator secured to the shank of the feed-screw, substantially as before set forth.

In testimony whereof I affix my signature in presence of two witnesses.

WASHINGTON FOGLESONG.

Witnesses:
A. A. WINTERS,
S. RUFUS JONES.